(12) United States Patent
Kumar et al.

(10) Patent No.: US 11,495,098 B2
(45) Date of Patent: *Nov. 8, 2022

(54) AGGREGATE MONITOR DATA IN REAL-TIME BY WORKER

(71) Applicant: Honeywell International Inc., Morris Plains, NJ (US)

(72) Inventors: Tarun Kumar, Irving, TX (US); Praveen Sharma, Dublin, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,671

(22) Filed: Mar. 11, 2020

(65) Prior Publication Data

US 2020/0211335 A1   Jul. 2, 2020

Related U.S. Application Data

(63) Continuation of application No. 16/783,452, filed on Feb. 6, 2020, which is a continuation of application
(Continued)

(51) Int. Cl.
*G08B 5/22* (2006.01)
*G08B 21/04* (2006.01)
*H04W 4/02* (2018.01)

(52) U.S. Cl.
CPC .......... *G08B 5/22* (2013.01); *G08B 21/0415* (2013.01); *G08B 21/0446* (2013.01); *G08B 21/0453* (2013.01); *H04W 4/023* (2013.01)

(58) Field of Classification Search
None
See application file for complete search history.

(56) References Cited

U.S. PATENT DOCUMENTS 8,807,131 B1   8/2014   Tunnell et al.
8,842,016 B1   9/2014   Cazanas et al.
(Continued)

FOREIGN PATENT DOCUMENTS

CH   2720210   *   4/2014   ............ G08B 21/02
EP   2463838 A1   6/2012
(Continued)

OTHER PUBLICATIONS

Advisory Action (PTOL-303) dated Aug. 8, 2018 for U.S. Appl. No. 14/936,438.
(Continued)

*Primary Examiner* — John F Mortell
(74) *Attorney, Agent, or Firm* — Alston & Bird LLP

(57) ABSTRACT

A worker monitoring system. The system comprises a processor, a display, a data store, a non-transitory memory, and an application stored in the non-transitory memory. The application stores definitions of associations of electronic monitors to workers in the data store, receives information from the electronic monitors via a wireless communication link, based on accessing the data store, analyzes information from a plurality of electronic monitors associated with one of the workers, corroborates information from a first electronic monitor associated with the one or the workers using information from a second electronic monitor associated with the one of the workers, and based on the corroboration of the information from the first electronic monitor, and presents an alarm indication on the display.

20 Claims, 7 Drawing Sheets

Related U.S. Application Data

No. 14/936,438, filed on Nov. 9, 2015, now Pat. No. 10,593,164.

(56) References Cited

U.S. PATENT DOCUMENTS

| | | | |
|---|---|---|---|
| 8,842,019 B2* | 9/2014 | Boccola | G08B 21/24 340/686.1 |
| 10,561,863 B1* | 2/2020 | Dashevsky | A61B 5/01 |
| 10,593,164 B2 | 3/2020 | Kumar et al. | |
| 2002/0070972 A1 | 6/2002 | Windl et al. | |
| 2004/0021569 A1 | 2/2004 | Lepkofker et al. | |
| 2008/0146892 A1* | 6/2008 | LeBoeuf | A61B 5/6803 600/300 |
| 2009/0040014 A1 | 2/2009 | Knopf et al. | |
| 2010/0102982 A1 | 4/2010 | Hoveida | |
| 2011/0029241 A1* | 2/2011 | Miller | G01C 22/006 701/500 |
| 2012/0217091 A1* | 8/2012 | Baillargeon | G08B 21/02 182/18 |
| 2012/0256742 A1 | 10/2012 | Snodgrass et al. | |
| 2013/0113619 A1 | 5/2013 | Snodgrass | |
| 2013/0183924 A1* | 7/2013 | Saigh | A61K 33/40 455/404.2 |
| 2013/0332184 A1 | 12/2013 | Burnham et al. | |
| 2015/0123787 A1* | 5/2015 | Watson | G06Q 10/06 340/539.13 |
| 2015/0302719 A1* | 10/2015 | Mroszczak | G08B 21/0469 340/539.12 |
| 2016/0292988 A1* | 10/2016 | McCleary | G08B 21/0446 |
| 2017/0132884 A1 | 5/2017 | Kumar et al. | |
| 2020/0175826 A1 | 6/2020 | Kumar et al. | |
| 2020/0211336 A1 | 7/2020 | Kumar et al. | |
| 2021/0209902 A1 | 7/2021 | Kumar et al. | |

FOREIGN PATENT DOCUMENTS

| | | |
|---|---|---|
| EP | 2482264 A2 | 8/2012 |
| EP | 2720210 A1 | 4/2014 |
| EP | 3360117 A1 | 8/2018 |
| EP | 3374977 A1 | 9/2018 |
| WO | 2015/099736 A1 | 7/2015 |
| WO | 2017/062030 A1 | 4/2017 |
| WO | 2017/083111 A1 | 5/2017 |

OTHER PUBLICATIONS

Advisory Action (PTOL-303) dated Oct. 22, 2019 for U.S. Appl. No. 14/936,438.
Europe Patent Application No. 15787772.1, Communication pursuant to Rules 161(1) and 162 EPC, dated Jul. 11, 2018, 3 pages.
Europe Patent Application No. 16795473.4, Communication pursuant to Rules 161(1) and 162 EPC, dated Jun. 15, 2018, 3 pages.
Final Rejection dated Jul. 30, 2019 for U.S. Appl. No. 14/936,438.
Final Rejection dated May 16, 2018 for U.S. Appl. No. 14/936,438.
International Application No. PCT/2015/054907, International Preliminary Report on Patentability, dated Apr. 10, 2018, 8 pages.
International Application No. PCT/2015/054907, International Search Report, dated Dec. 21, 2015, 5 pages.
International Application No. PCT/2015/054907, Written Opinion of the International Searching Authority, dated Dec. 21, 2015, 7 pages.
International Preliminary Report on Patentability received for PCT Patent Application No. PCT/US2016/059060, dated May 24, 2018, 15 pages.
International Search Report and Written Opinion received for PCT Patent Application No. PCT/US2016/059060, dated Jan. 27, 2017, 17 pages.
Khasawneh M et al: "A secure novel sensor fusion architecture for nuclear applications", Mechatronics and Its Applications, 2008. ISMA 2008. 5th International Symposium on, IEEE, Piscataway, NJ, USA, May 27, 2008 (May 27, 2008), pp. 1-11.
Mauro De Sanctis et al: "Interoperability solutions between smartphones and Wireless Sensor Networks", Satellite Telecommunications (ESTEL), 2012 IEEE First AESS European Conference on, IEEE, Oct. 2, 2012 (Oct. 2, 2012), pp. 1-6.
Non-Final Rejection dated Apr. 15, 2020 for U.S. Appl. No. 16/783,452.
Non-Final Rejection dated Oct. 4, 2017 for U.S. Appl. No. 14/936,438.
Non-Final Rejection dated Sep. 25, 2018 for U.S. Appl. No. 14/936,438.
Notice of Allowance and Fees Due (PTOL-85) dated Nov. 7, 2019 for U.S. Appl. No. 14/936,438.
Examiner initiated interview summary (Ptol-413B) Mailed on Aug 04, 2020 for US Application No. 16783452.
Notice of Allowance and Fees Due (PTOL-85) dated Aug. 4, 2020 for U.S. Appl. No. 16/783,452.
Notice of Allowance and Fees Due (PTOL-85) dated Nov. 12, 2020 for U.S. Appl. No. 16/783,452.
Non-Final Rejection dated Mar. 17, 2021 for U.S. Appl. No. 16/815,786.
Office Action received for European Application No. 16795473, dated Aug. 17, 2021, 14 pages.
Final Office Action received for U.S. Appl. No. 16/815,786, dated Jul. 23, 2021, 23 pages.
Notice of Allowance received for U.S. Appl. No. 16/815,786, dated Oct. 20, 2021, 11 pages.
Non-Final Office Action received for U.S. Appl. No. 16/815,786, dated Jan. 26, 2022, 11 pages.
Non-Final Office Action received for U.S. Appl. No. 17/212,869, dated Jan. 28, 2022, 19 pages.
Notice of Allowance, including Interview Summary, received for U.S. Appl. No. 16/815,786, dated Mar. 10, 2022, 11 pages.
Notice of Allowance and Fees Due (PTOL-85) dated Jun. 21, 2022 for U.S. Appl. No. 17/212,869, 9 pages.

* cited by examiner

AGGREGATE MONITOR DATA IN REAL-TIME BY WORKER

CROSS-REFERENCE TO RELATED APPLICATIONS

This application is a continuation application of and claims priority from U.S. patent application Ser. No. 16/783,452 filed Feb. 6, 2020, which is a continuation application of and claims priority from U.S. patent application Ser. No. 14/936,438, entitled "Aggregate Monitor Data in Real-Time by Worker," filed Nov. 9, 2015, which is incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many workplaces have hazards that workers are desirably protected from. For example, hazardous chemicals may be present and unforeseen failures of containment systems may release the chemicals, exposing workers to potentially harmful fluids or gases. Worker exposure to workplace hazards may be monitored to assure exposure does not exceed acceptable exposure thresholds. Procedures and policies may be instituted to protect workers and to reduce the risk that they will be injured in the workplace. Workplace accidents can reduce worker quality of life or kill workers. Workplace accidents can result in lost worker productivity and to avoidable healthcare costs.

SUMMARY

In an embodiment, a worker monitoring system is disclosed. The system comprises a processor, a display, a data store, a non-transitory memory, and an application stored in the non-transitory memory. When executed by the processor the application receives definitions of associations of electronic monitors to workers, where the electronic monitors are carried by the workers in a work environment, stores the definitions of associations of the electronic monitors to the workers in the data store, and receives information from the electronic monitors via a wireless communication link. The application further, based on accessing the data store, analyzes information from a plurality of electronic monitors associated with one of the workers to determine a safety status of that worker, corroborates information from a first electronic monitor associated with the one or the workers using information from a second electronic monitor associated with the one of the workers, and based on the corroboration of the information from the first electronic monitor, presents an alarm indication on the display, where selection of the alarm indication by a user interface causes details about the one of the workers to be presented in a drill-down frame on the display.

In another embodiment, a method of monitoring worker safety is disclosed. The method comprises receiving by a monitoring station definitions of associations of electronic monitors to workers, where the electronic monitors are carried by the workers in a work environment and the monitoring station is a computer system, storing the definitions of associations of the electronic monitors to the workers by the monitoring station in a data store, and receiving by the monitoring station information from the electronic monitors via a wireless communication link. The method further comprises, based on accessing the data store, analyzing information from a plurality of electronic monitors associated with one of the workers by the monitoring station to determine a safety status of that worker and corroborating by the monitoring station information from a first electronic monitor associated with the one or the workers using information from a second electronic monitor associated with the one of the workers. The method further comprises, based on the corroboration of the information from the first electronic monitor, presenting an alarm indication on a display by the monitoring station, receiving a selection of the alarm indication by a user interface of the monitoring station, and, responsive to receipt of selection of the alarm indication, presenting details about the one of the workers in a drill-down frame on the display by the monitoring station.

In yet another embodiment, a method of monitoring worker safety is disclosed. The method comprises receiving by a monitoring station definitions of associations of electronic monitors to workers, where the electronic monitors are carried by the workers in a work environment and the monitoring station is a computer system and storing the definitions of associations of the electronic monitors to the workers by the monitoring station in a data store. The method further comprises receiving by the monitoring station information from the electronic monitors via a wireless communication link and, based on accessing the data store, analyzing information from a plurality of electronic monitors associated with one of the workers by the monitoring station. The method further comprises, based on the analysis of information from the plurality of electronic monitors associated with one of the workers, synthesizing a model that articulates a comprehensive view of the safety of the one of the workers by the monitoring station and presenting the comprehensive view of the safety of the one of the workers on a display of the monitoring station.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
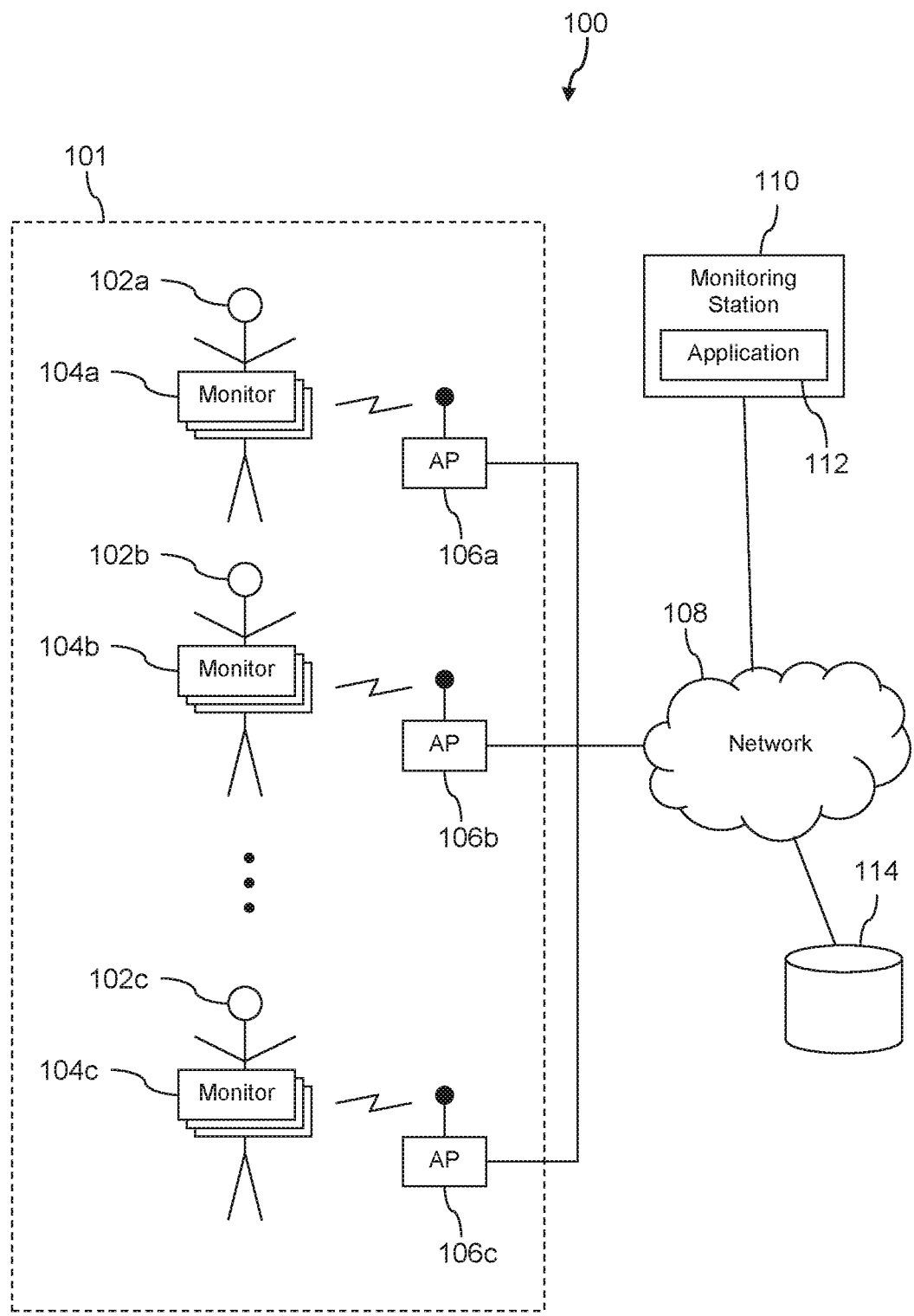
FIG. 1 is a block diagram of a system for promoting worker safety in the workplace according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Workplaces can place workers in hazardous conditions. It is desirable to promote worker consciousness of these hazards so they do not become indifferent or insensitive to these hazards and to alert workers when an unexpected hazard is present. Further, it is desirable that others, for example a safety monitor or worker supervisor, can monitor the hazards that the workers may be vulnerable to so that they can encourage the workers to exercise due caution and care and, if needed, to dispatch assistance in the event that the worker is in need of help. The present disclosure teaches a worker safety monitoring system that aggregates sensor or monitor information by worker, to provide a worker-centric view of the workplace hazards. This system may be advantageously deployed in a wide variety of work environments including, but not limited to, refineries, chemical plants, paper plants, semiconductor manufacturing plants, food processing plants, transportation sites, construction sites, hazardous materials cleanup teams, national safety teams, and the like.

A worker may be equipped with and/or carry on his or her person a plurality of different monitors or instruments. These monitors may transmit data about the local work environment via a wireless communication link to a monitoring station for processing. In some contexts, the monitoring station may be referred to as a centralized monitoring station. In some cases, a worker may carry a mobile phone, the monitors may be communicatively coupled to the phone via short-range wireless communication links (WiFi, Bluetooth, near-field-communication (NFC), or other), and the phone may relay information from the monitors via a cellular wireless link to the monitoring station and commands from the monitoring station to the monitors.

In some circumstances, however, the monitors may establish wireless communication links with the monitoring station independently of the mobile phone (the mobile phone is not part of the system in a given implementation or the mobile phone's battery is discharged or the phone is broken during an industrial accident), for example via a WiFi wireless infrastructure or a mesh wireless infrastructure installed at the worksite. To promote monitors communicating independently with the monitoring station, at the start of a workday, an electronic scanner may read the identities of each of the monitors or instruments carried by a worker and associate these identities to the identity of the individual worker in a data store accessible to or part of the monitoring station. The identity of the worker may be provided at the time of or immediately preceding the electronic scanning to support the association of the identities of the monitors or instruments to the identity of the worker. Alternatively, a worker or supervisor of the worker may input identities of the monitors or instruments via a user interface into the monitoring station.

The monitoring station receives information from monitors from a plurality of workers at the work site. The monitoring station organizes the information from the monitors by worker and analyzes the organized information to form a worker-centric view of the workplace. Said in other words, the monitoring station collects the information from each of the sensors associated with a worker, analyzes that information segregated by worker, and determines (based on the segregated information associated to that specific worker from monitors associated to that worker) if the worker is in a work location that merits setting an alarm event, setting a fault event, or setting an issue event. Setting of events will be reflected on a user interface display of the monitoring station as well as possibly providing a presentation of some kind of alert or alarm to the worker, for example an audible alert, a visual alert, or a vibration alert. In some contexts, the monitoring station may be referred to as a centralized monitoring station.

The monitoring station can interpret information provided by one monitor associated with a worker based on information provided by other monitors associated with the same worker. This may be referred to as corroborating monitor indications. For example, if a gyroscope monitor indicates that a worker is on the ground (a "man down" situation) and a gas sensor associated with the same worker indicates the presence of a hazardous gas, the worker may be judged to be truly in a "man down" situation and assistance may be urgently dispatched to help the worker. On the other hand, if a gyroscope monitor indicates that a worker is on the ground but a self-location sensor carried by the worker indicates the worker is moving at a walking pace and vital signs transmitted from a biomonitor associated with the worker indicate all vital signs are normal, the gyroscope monitor indication may be distrusted. In this case, a supervisor may attempt to make audio contact with the subject worker.

The monitoring station can further interpret information from monitors from multiple different workers to establish a picture of the workplace. For example, a gas detector of a first worker may indicate the presence of a hazardous gas in an area in a concentration below an alarm threshold of concentration. A gas detector of a second worker who passes through the same area 5 minutes later may indicate the presence of the same hazardous gas in the area in a concentration still below the alarm threshold of concentration but at a concentration that has increased.

The monitoring station can associate these independent indications and synthesize a model of a gas leak of hazardous gas in the area that is increasing in concentration and hence increasing danger posed to workers. For example, the monitoring station can define an equation that approximates a time-based gas leak function, and employ this equation to predict or estimate a future gas concentration in the work environment. This equation or a plurality of equations may be referred to as a model and the process of creating the equation or equations synthesis of the model. The synthesized model of the work environment or a portion of the work environment, along with explicit information provided by monitors and instruments carried by workers, can be used by the monitoring station to construct and/or articulate a comprehensive view of the safety of one or more of the workers, and the monitoring station, based on this comprehensive view of worker safety, may take action proactively to correct the issue before the hazardous gas actually accumulates and/or concentrates to a dangerous level.

Turning now to FIG. 1, a system 100 is described. In an embodiment, the system 100 comprises a work yard 101, a plurality of workers 102, a plurality of monitors 104 and/or instruments associated with each of the workers 102, and a plurality of wireless access points (APs) 106. The APs 106 provide wireless communication links to the monitors 104 to a network 108. The system 100 further comprises a monitoring station 110 executing a worker safety monitoring application 112 and a data store 114. The monitoring station 110 may be implemented as a computer system. Computer systems are discussed further hereinafter.

The network 108 comprises one or more private networks, one or more public networks, or a combination thereof. It is observed that the monitoring station 110 and the data store 114 may be located on a work site, for example on the grounds of a refinery, but may be located in a safe building that is at least presumably isolated from hazards of the work yard 101. The work yard 101 may be an area containing fractioning towers, distillation columns, heat exchangers, burners, mixers, and/or reactors. The work yard 101 may contain tanks filled with chemicals, crude oil, distillates, or gases. The work yard 101 may contain fluid lines, valves, etc. The work yard 101 may be referred to in some contexts as a work site and/or a work environment.

Each worker 102 may carry a plurality of monitors 104 or instruments. For example, the worker 102 may carry two or more of a gas detector (possibly multiple gas detectors, each configured to detect the presence of a different gas), a dust detector, a radiation detector, a temperature sensor, a humidity sensor, a self-contained breathing apparatus (SCBA), a bio-harness, a self-location device, a gyroscope, an accelerometer, hearing protection, vision protection, safety clothing such as hard hat, steel toed boots, electrical safety gloves, electrical safety boots, chemical safety boots, and the like. In some cases the monitors 104 may collect information and relay the information via the AP 106 to the monitoring station 110. In some cases the monitors 104 may simply indicate a presence (i.e., that safety equipment is being worn as is customary or mandated by operational procedures). In an embodiment, the monitors 104 may comprise an audio monitor (i.e., a microphone) and/or a video camera. The audio monitor and/or video camera may not stream data to the monitoring station 110 but may be selectable by an operator of the monitoring station 110.

The gas detectors may identify gas level or concentration readings as well as identity of the gas. Alternatively, different gas detectors may be configured to identify specific gases. A dust detector can detect a concentration of particulate matter and/or of aerosols in the breathing environment of the worker 102. The radiation detector may detect the presence of radiation of one type or of multiple types of radiation, for example ionizing radiation such as gamma rays, alpha rays, beta rays, and the like. The radiation detector optionally may further determine an accumulated radiation exposure (i.e., a summation of incident radiation across a plurality of time intervals).

An SCBA may monitor a pressure differential between the environment (i.e., the work yard 101) and the breathing chamber formed between a face mask of the SCBA and the nose and mouth of the worker 102. The SCBA may monitor an air flow rate. A bio-harness may read the vital signs of the worker 102, for example reading one or more of a respiration rate, a heart rate, a temperature of the worker, and others. The bio-harness (or alternatively the SCBA) may monitor for presence and/or concentration of alcohol in the exhalation of the worker 102.

A self-location device may be a GPS receiver and transmit location information to the monitoring station 110. Alternatively, the self-location device may determine location by tri-lateration methods and transmit location information to the monitoring station 110. Alternatively, the self-location device may promote location of the worker 102 by another part of the system 100, for example by transmitting an omnidirectional wireless signal with a calibrated signal strength: the system may use a received signal strength of the omnidirectional wireless signal to tri-laterate the position of the worker 102. For example, the WiFi APs 106 may perform tri-lateration position location algorithms or hand-off received signal strength information and corresponding electronic monitor identity (e.g., self-location electronic monitor identity) so the identity of the worker 102 can be established by the monitoring station 110 (i.e., by looking up the association between the identity of the electronic monitor 104 and the identity of the associated worker 102).

When the worker 102 prepares to dispatch to the work yard 101, for example when suiting up and/or donning protective equipment and monitors, the identity of monitors 104 may be associated with each specific worker 102. This may be done by scanning bar codes or RFID tags coupled to the subject monitors 104 with a scanner device or reader device, entering an identity of the worker 102 in an interface of the monitoring system 110, and creating by the monitoring system 110 an association between the identity of the worker 102 and the monitors 104 carried by the worker 102. The identities of the monitors 104 may be electronic serial numbers (ESNs), media access control (MAC) addresses, or other unique electronic identifiers. The identity of a worker may be a personal name, an employee number, or some other identifier that uniquely identifies the worker. The association of identities of monitors 104 to the identity of workers 102 may be established in a different way, for example by an electronic scanner coupled to a workstation or laptop computer or other computer (not shown) different from the monitoring station 110. The worker and/or supervisor of the worker may manually enter the identities of monitors 104 associated with the identity of the worker 102 in an input screen and/or user interface of the workstation or laptop computer (rather than scanning automatically by an electronic bar code scanner or by an electronic RFID reader). The association information may then be transmitted via the network 108 to the monitoring station 110, and the monitoring station 110 may then store the associations in the data store 114 and/or in main memory of the monitoring station.

When the worker 102 dispatches to the work yard 101 (e.g., walks out or drives out to a distillation column at a refinery) the monitors 104 may transmit information via the APs 106 to the network 108 and via the network 108 to the monitoring station 110. The monitors 104 may transmit current information periodically, for example once per second, once every ten seconds, once every minute, or at some other periodic rate. Different monitors 104 may transmit information at different periodic rates. The information that is transmitted embeds in it (e.g., in a data packet containing the information) the identity of the subject monitor 104. In an embodiment, the monitoring station 110 and/or the application 112 and/or the APs 106 alternatively may poll the monitors 104 or at least some of the monitors 104 (i.e., rather than the subject monitors 104 transmitting information periodically they may be polled). The monitoring station 110 and the application 112 associates or organizes the information received from the monitors 104 worker-by-worker, and then analyzes the information associated with each worker 102 in turn.

Figure 2:
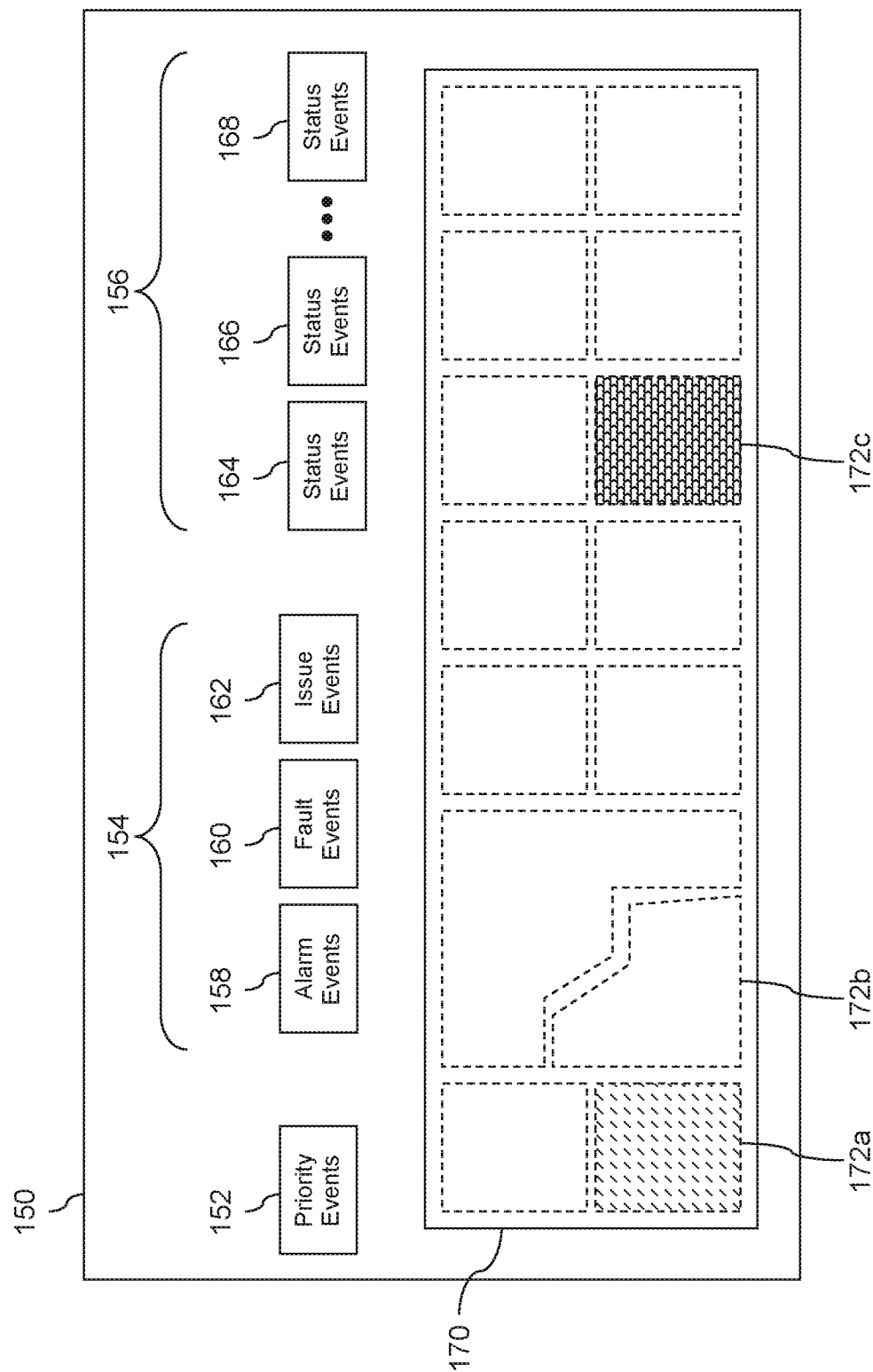
FIG. 2 is an illustration of a user interface of a monitoring station according to an embodiment of the disclosure.

Turning now to FIG. 2, a user interface 150 is described. The user interface 150 represents information about the workers 102, the monitors 104, and the work yard 101 and presents the information in a manner that desirably can be quickly interpreted by an operator of the monitoring station 110 and promote rapid drilling down to obtain further details. In an embodiment, a dash strip at the top of the user interface 150 comprises a worker centric priority events box 152, a plurality of event level summary boxes 154, and a plurality of system status boxes 156. In an embodiment, the event level summary boxes 154 comprise an alarm events summary box 158, a fault events summary box 160, and an issue events summary box 162. In an embodiment, the system status boxes 156 may indicate how many monitors 104 are associated with self-location information (i.e., are associated with a worker 102 for whom self-location information is available, for example self-location information obtained from at least one of the monitors 104 associated to that worker 102), how many monitors 104 are off-line, how many monitors 104 are on-line, how many monitors 104 are associated with expired software licenses, and the like statuses. The status boxes 156 may include, for example, a first status events box 164, a second status events box 166 and a third status events box 168. Some of the status may indicate status of sensors and instruments that are not carried by workers 102 but may be coupled to or positioned proximate to entities in the work yard 101.

Generally, events are conditions associated with monitors 104 and/or equipment sensors in the work yard 101 that are abnormal in some way. Alarm events are associated with hazardous conditions that desirably are to be addressed immediately or as soon as possible. In some cases, alarm events are associated with hazardous conditions that have the potential to cause loss of human life. Fault events are associated with conditions that are not in themselves life threatening but can lead to life threatening conditions later if neglected and can lead to degradation or damage to equipment and/or loss of material resources. Issue events are associated with minor device conditions that relate to lack of compliance, for example a sensor that is overdue for calibration. Alarm events, fault events, and issue events may be referred to as three different event categories, tiers, or classes. Alarm events are considered to be the highest priority event category; fault events are considered the next highest priority event category; and issue events are considered the lowest priority event category.

The worker centric priority events box 152 presents information on live events in the work yard 101 from the perspective of workers and according to event category priority. If no events linked to workers are currently active, the worker centric priority events box 152 may display in green with a count of the total number of workers 102 dispatched to the work yard 101. If events are active, the highest priority event category will be summarized in the worker centric priority events box 152. Thus, if any alarm events are active, the alarms are summarized in box 152; if no alarm events are active but fault events are active, the faults are summarized in box 152; if no alarm events or fault events are active but issue events are active, the issue events are summarized in box 152.

The user interface 150 further comprises a map 170 of the work yard 101. The map 170 may be highly abstracted, as for example divided into a grid work of zones or geometrically shaped zones. In FIG. 2, example work zones 172a, 172b, and 172c are labeled. In some embodiments, the map 170 may comprise a two-dimensional image of the work yard 101, for example a satellite image of the work yard 101 that shows individual large-scale entities in the work yard 101, such as storage tanks, distillation columns, and the like. In such a map, geometrical shapes may be superimposed over the image to define general zones of the work yard 101. If a worker 102 associated with active events is located in zones 172 of the work yard 101, the presentation of the subject zone 172 may be highlighted or otherwise graphically distinguished to indicate the highest tier event associated with the zones 172. For example, zone 172a may indicate that a worker 102 in zone 172a has a monitor 104 experiencing an issue; zone 172c may indicate that a worker 102 in zone 172c has a monitor 104 experiencing an alarm; while zone 172b may indicate that no alarms, faults, or issues are associated with any worker 102 located in zone 172b.

Figure 3:
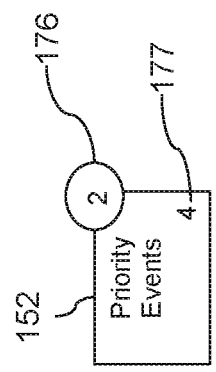
FIG. 3 is an illustration of a detail of the user interface of the monitoring station according to an embodiment of the disclosure.

Turning now to FIG. 3, further details of the worker centric priority events box 152 are illustrated. The box 152 may show a number of new events 176 in a circle at the upper right edge of the box. When an operator of the monitoring station 110 has acknowledged and/or processed an event, that event is no longer deemed a new event and is no longer counted in the number of new events shown in the circle 176. The lower right corner of the box 152 may show the total number of active events of the highest priority event category. For example, if any alarm events are active, the number would represent the number of active alarm events; if no alarm events are active but any fault events are active, the number 177 would represent the number of active fault events; if no alarm events or fault events are active, but any issue events are active, the number 177 would represent the number of active issue events. This representation of numbers of new events and numbers of active events may likewise be applied to the event centric boxes 158, 160, 162, with the understanding that the numbers in each case associate to the numbers of new events and active events of the associated event category.

Figure 4:
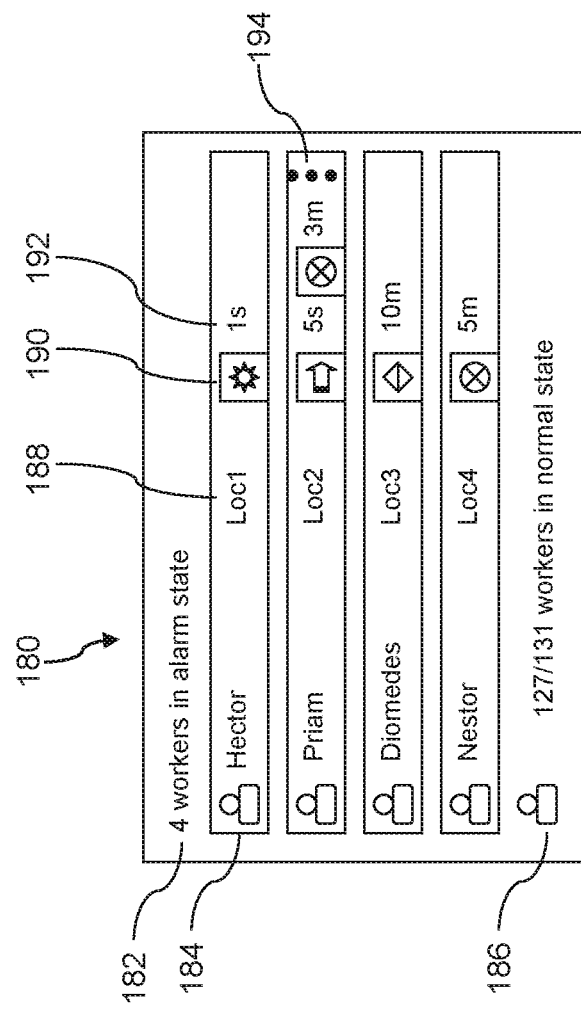
FIG. 4 is an illustration of a drill-down frame of the user interface of the monitoring station according to an embodiment of the disclosure.

Turning now to FIG. 4, further details of the user interface 150 are described. If the worker centric priority events box 152 is clicked, a worker events drill-down window 180 is presented in the display. In an embodiment, the window 180 may comprise a summary of events field 182 that indicates how many workers are experiencing the subject event category. Below the summary field 182, a list of workers experiencing the subject event category is presented. Each entry in the list comprises a worker name 184, a worker location 188, and an event icon 190. The worker location 188 may be determined by a self-location electronic monitor 104 associated with the workers 102. In some cases, the worker location 188 may be unknown and may be indicated as such (i.e., "unknown" or "?"). The event icon 190 may be highlighted in a color that indicates the event category as alarm, fault, or issue so an operator can more rapidly appraise the seriousness of the subject events. The event icon 190 may graphically indicate a specific event, for example a man-down event, a gas high event, an invalid data range event, etc. (i.e., different events are represented using different event icons 190).

A time duration field 192 indicates a time over which the subject event has been active. If a second event is also active for the subject worker, the event icon 190 and time duration for the second event is also presented. If more than two events are active for the subject worker, an indication of other events 194 is presented. The indication 194 can be clicked on to display the additional events. At the bottom of the window 180 a field 186 may indicate a number of workers in the normal state versus the total number of workers 102 present in the work yard 101. The information presented in the window 180 may update in real-time or near real-time as information from electronic monitors 104 is received by the monitoring station 110. In an embodiment, the window 180 may be implemented using Asynchronous JavaScript and XML (AJAX), rich site summary (RSS), or other software constructs or libraries that support dynamic information refresh in user interfaces.

In an embodiment, the monitoring station 110 may automatically dispatch assistance personnel to a location of a worker 102 that is associated with an alarm or corroborated alarm, for example a "man down" alarm or a gas high concentration alarm. Alternatively, an operator of the monitoring station 110 may select a control button of the user interface 150 or of the events drill-down window 180 to dispatch assistance personnel to the location of the worker 102 that is associated with an alarm or corroborated alarm.

Figure 5:
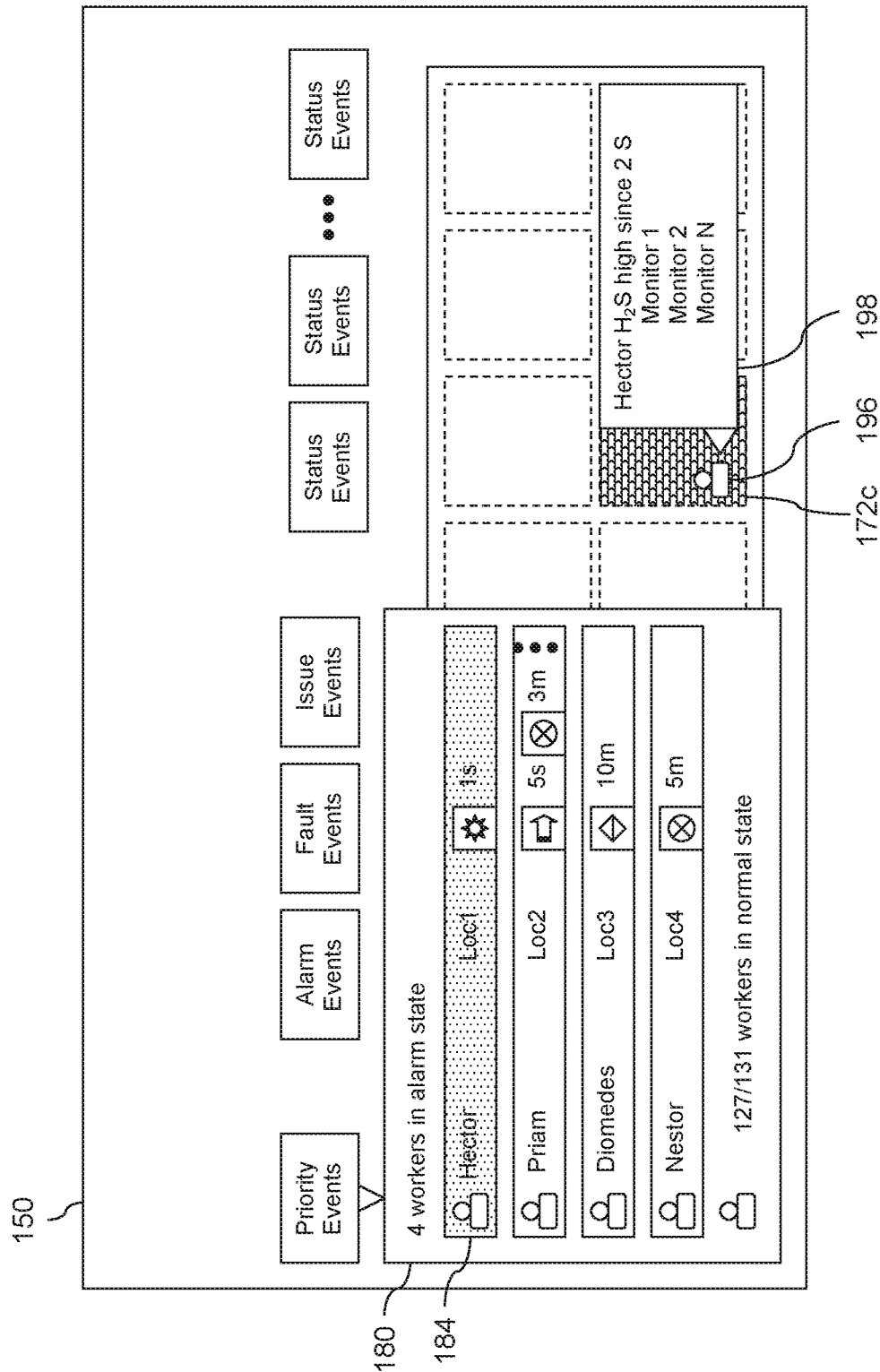
FIG. 5 is an illustration of another drill-down frame of the user interface of the monitoring station according to an embodiment of the disclosure.

Turning now to FIG. 5, further details of the user interface 150 are described. If a worker name in the window 180 (e.g., the entry 184 for worker named Hector) is clicked, the entry highlights and an effigy 196 of the subject worker is presented in the map 170 at a position that corresponds to the physical location of the worker 102. The effigy 196 may be an abstract shape, icon, or simplified graphical representation of the worker 102. Additionally, a window 198 is presented that provides further information about the monitors 104 associated with the worker. In this case, an $H_2S$ monitor 104 associated with the worker 102 named Hector has detected a high reading. Statuses of other monitors 104 associated with the worker Hector are also presented in the window 198. The window 198 may identify or list all of the kinds of monitors 104 carried by the subject worker 102. The window 198 may allow an operator of the monitoring station 110 to click on an entry for a monitor 104 in the window 198 to see a drill-down view or further details about the subject monitor 104. For example, this monitor drill-down view may provide a trend line of data provided by the monitor 104 over time.

It is understood that the user interface 150 is contemplated to have a variety of other supporting features to promote rapid understanding of worker centric safety and rapid access to further details on selected events and/or workers 102. For example, the user interface 150 may provide controls for an operator of the monitoring station 110 to select turning on streamed audio and/or video from a specific worker 102, for example to further analyze events reported by monitors 104 carried by the worker 102. This may involve sending a command from the monitoring station 110 and/or application 112 to the worker 102 (i.e., to the audio and/or video instruments carried by the worker 102). The audio and/or video may be stored in the data store 114 as a time sequence of frames (audio frames and/or video frames) that is linked to corresponding readings and/or information from monitors 104. This storage of streamed audio and/or video data synchronized with data from monitors 104 of corresponding time intervals can support retrospective forensic analysis.

The user interface 150 further may support an operator of the user interface 150 and/or the monitoring station 110 to send other commands to the monitors 104, for example commands to present an alert to the worker 102. Further, it is understood that in some embodiments the user interface 150 may differ from the features and functions described above. The window 198 may also provide a button that an operator of the user interface 150 may select to dispatch assistance personnel to the location of the worker 102 that is associated with an alarm or corroborated alarm.

Figure 6:
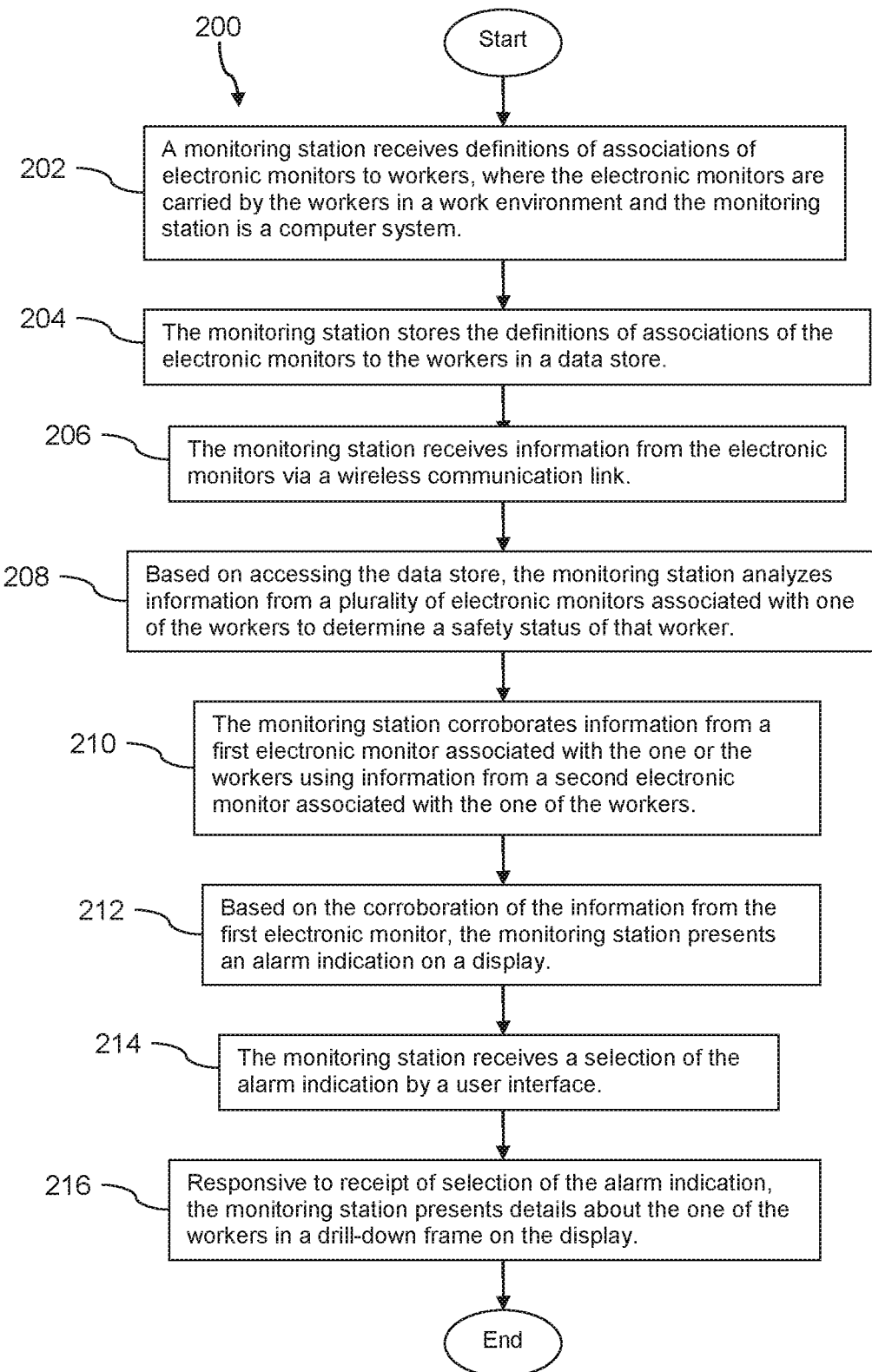
FIG. 6 is a flow chart of a method according to an embodiment of the disclosure.

Turning now to FIG. 6, a method 200 is described. At block 202, a monitoring station receives definitions of associations of electronic monitors to workers, where the electronic monitors are carried by the workers in a work environment and the monitoring station is a computer system. For example, the monitoring station 110 receives definitions of associations of identities of the monitors 104 to identities of the workers 102. The information may be received from an electronic scanning device or from an application executing on a computer that is coupled to an electronic scanning device. Alternatively, workers and/or supervisors of workers may manually enter identities of monitors 104 and link them or associate them to the identities of the workers 102 using a user interface of a work station or computer before dispatching to the work yard 101.

At block 204, the monitoring station stores the definitions of associations of the electronic monitors to the workers in a data store. For example, the monitoring station 110 stores the definitions of the associations of the identities of the monitors 104 to the identities of the workers 102 in the data store 114. While shown as a separate entity in FIG. 1, it is understood that the data store 114 may be located not in a disk drive exterior to the monitoring station 110 but instead may be stored in main memory in the monitoring station 110.

At block 206, the monitoring station receives information from the electronic monitors via a wireless communication link. The monitoring station 110 and/or the application 112 may receive the information from the monitors 104 via a WiFi wireless link between the monitors 104 and WiFi APs 106, and via a wired link from the WiFi APs 106 to the network 108. Alternatively, the monitoring station 110 and/or the application 112 may receive the information from the monitors 104 via a WiFi, Bluetooth, or near-field-communication (NFC) wireless link between the monitors 104 and mobile phones, via a cellular wireless link between the mobile phones and a cell tower, and via a wired link from the cell tower to the network 108 (it is understood that the network 108 may be deemed to comprise the cell towers and/or other cellular phone communication equipment infrastructure).

At block 208, based on accessing the data store, the monitoring station analyzes information from a plurality of electronic monitors associated with one of the workers to determine a safety status of that worker. The monitoring station 110 may determine that various events associated with the monitors 104 have occurred or continue to be active based on information transmitted by the monitors 104. The events may be analyzed by the monitoring station 110 to determine alarms, faults, and issues related to specific monitors 104 and associate these events to the workers 102 that associate to the subject monitors 104. In this way, the monitoring station 110 can determine a safety status of the workers 102. The safety status of the workers 102 may be determined based on events associated with the monitors 104 but further based on information from other sensors or instruments in the work yard 101 not carried by workers 102. The complete picture of worker safety status may be developed by the application 112 based on analyzing the combination of the information transmitted by the monitors 104 and information transmitted by other sensors and instruments not carried by workers 102.

At block 210, the monitoring station corroborates information from a first electronic monitor associated with the one or the workers using information from a second electronic monitor associated with the one of the workers. At block 212, based on the corroboration of the information from the first electronic monitor, the monitoring station presents an alarm indication on a display. For example, the monitoring station 110 presents an alarm indication on one or more of the user interface 150, in the worker centric priority events box 152, in the window 180, and/or in the window 198. It is understood that the monitoring station 110 may further present indications of faults and issues based on the analysis of information from monitors 104 and/or sensors and instruments in the work yard 101. At block 214, a user interface of the monitoring station receives a selection of the alarm indication. At block 216, responsive to receipt of selection of the alarm indication, the monitoring station presents details about the one of the workers in a drill-down frame on the display.

Figure 7:
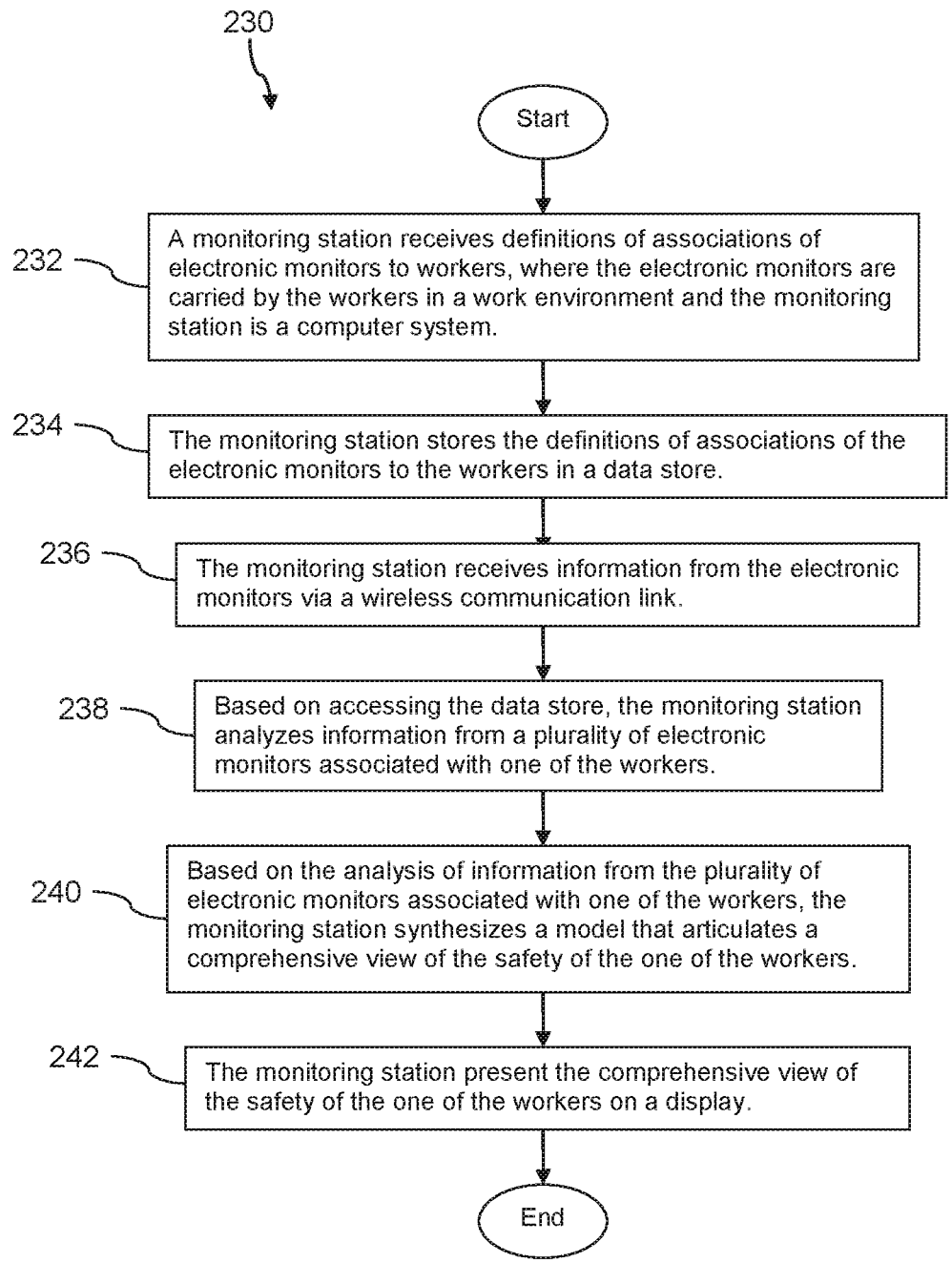
FIG. 7 is a flow chart of another method according to an embodiment of the disclosure.

Turning now to FIG. 7, a method 230 is described. At block 232, a monitoring station receives definitions of associations of electronic monitors to workers, where the electronic monitors are carried by the workers in a work environment and the monitoring station is a computer system. For example, the monitoring station 110 and/or the application 112 receives definitions of associations of the identities of the monitors 104 to the identities of the workers 102 that carry the monitors 104. At block 234, the monitoring station stores the definitions of associations of the electronic monitors to the workers in a data store. At block 236, the monitoring station receives information from the electronic monitors via a wireless communication link.

At block 238, based on accessing the data store, the monitoring station analyzes information from a plurality of electronic monitors associated with one of the workers. At block 240, based on the analysis of information from the plurality of electronic monitors associated with one of the workers, the monitoring station synthesizes a model that articulates a comprehensive view of the safety of the one of the workers. For example, the monitoring station 110 and/or the application 112 creates one or more predictive and/or estimating equations based on information from at least some of the monitors 104 (possibly from monitors 104 associated with different workers 102, for example workers 102 who have passed through a same location in the work yard 101 over a period of time).

The predictive equation or model may be used by the monitoring station 110 and/or application 112 to estimate or predict a future state of the work yard 101 at the location of the worker 102 (or workers 102 in about the same location). Based on this prediction of the future state of the work yard 101 (excessive concentration of a potentially harmful gas in 5 minutes if current leak trends articulated in the synthesized model continues) and based on other information provided by monitors 104 and/or sensors and instruments in the work yard 101 not carried by the workers 102, the monitoring station 110 and/or the application 112 develops a comprehensive view of the safety of one or more of the workers 102. At block 242, the monitoring system presents the comprehensive view of the safety of the one of the workers on a display. For example, alarms events, fault events, and/or issue events associated with monitors 104 carried by the worker 102 are presented in the user interface 150.

The present disclosure contemplates the monitoring station 110, the application 112, and the system 100 contributing to moving from reactive worker safety promotion systems to a proactive system—a system that proactively promotes worker safety before injuries and/or harmful exposures take place. It is understood that the descriptions above illustrate some of these features, but the system 100 is thought to be a suitable platform for achieving yet other proactive measures not described in the examples above.

Figure 8:
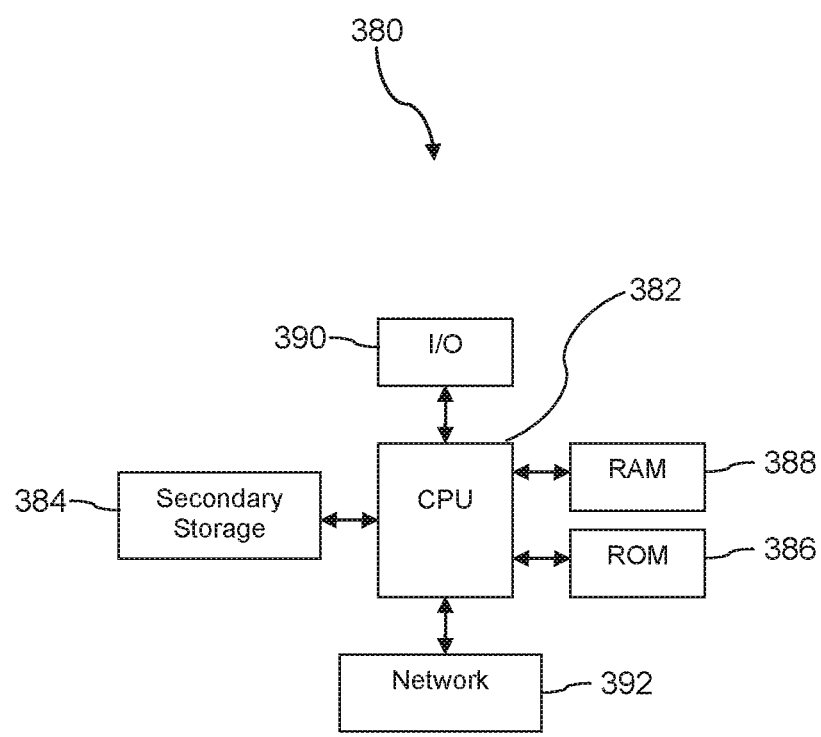
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A worker monitoring system, comprising:
   a processor;
   a display;
   a data store;
   a non-transitory memory; and
   an application stored in the non-transitory memory that, when executed by the processor:
   receives definitions of associations of a plurality of electronic monitors to a first worker, where the plurality of electronic monitors are carried by the first worker in a work environment, stores the definitions of associations of the plurality of electronic monitors to the first worker in the data store;
   receives information from certain monitors of the plurality of electronic monitors via a wireless communication link;
   interprets information from a first electronic monitor of the plurality of electronic monitors based upon information from a second electronic monitor of the plurality of electronic monitors, wherein the first electronic monitor is one of a bio-harness, a self-location device, a gyroscope, or an accelerometer;
   interprets information from the first electronic monitor based upon information from one or more electronic monitors associated with a second worker; and
   based on the interpretation of the information from the first electronic monitor based upon information from the second electronic monitor and the interpretation of the information from the first electronic monitor based upon information from one or more electronic monitors associated with the second worker, determines a safety status of the first worker.

2. The system of claim 1, wherein the first worker carries two or more different electronic monitors, each configured to transmit different information about the environment.

3. The system of claim 1, wherein the second electronic monitor is one of (i) a gas detector, a dust detector, a radiation detector, a temperature sensor, a humidity sensor, or a self-contained breathing apparatus (SCBA) or (ii) another bio-harness, biometer, gyroscope, or accelerometer.

4. The system of claim 1, where in the processor is further configured to present one or more of an alarm indication, a fault indication, or an issue indication on the display.

5. The system of claim 1, wherein the first electronic monitor comprises the gyroscope monitor configured to indicate a man down situation and the second electronic monitor comprises a gas sensor, and wherein interpretation of the information from the first electronic monitor comprises interpretation of the man down situation from the gyroscope monitor by analysis of information from the gas sensor.

6. The system of claim 1, wherein the wireless communication link is provided to the plurality of electronic monitors by a plurality of wireless access points (AP) connected via a wired network to the processor.

7. The system of claim 1, wherein the wireless communication link is provided at least in part by a cellular wireless link between a mobile phone and a cell tower, where a mobile phone is associated with the first worker that communicatively couples the plurality of electronic monitors carried by the first worker to the cell tower and the cell tower communicatively couples via a wired network to the processor.

8. The system of claim 1, where the application further automatically dispatches assistance personnel to care for the first worker based on an alarm indication;
   wherein the application automatically dispatches assistance personnel to a location determined from information sent via the wireless communication link by a self-location monitor associated with the first worker.

9. The system of claim 1, wherein the first electronic monitor is a bio-harness.

10. The system of claim 9, wherein the bio-harness reads vital signs of the first worker.

11. The system of claim 1, wherein the first electronic monitor reads the vital signs of the first worker.

12. The system of claim 10, wherein the vital signs comprise at least one of a respiration rate, a heart rate, and a temperature.

13. The system of claim 11, wherein the vital signs comprise at least one of a respiration rate, a heart rate, and a temperature.

14. The system of claim 1 further comprising a monitoring station, wherein the monitoring station receives information from the plurality of electronic monitors.

15. The system of claim 1, wherein determining the safety status of the first worker further comprises interpreting data collected over a period of time.

16. The system of claim 1, wherein the information from certain monitors of the plurality of electronic monitors is utilized to provide trending information over time.

17. The system of claim 14, wherein determining the safety status of the first worker further comprises interpreting data collected over a period of time.

18. The system of claim 14, wherein the information from certain monitors of the plurality of electronic monitors is utilized to provide trending information over time.

19. A worker monitoring system, comprising:
a processor;
a display;
a data store;
a non-transitory memory; and
an application stored in the non-transitory memory that, when executed by the processor:
  receives definitions of associations of a plurality of electronic monitors to a first worker;
  stores the definitions of associations of the plurality of electronic monitors to the first worker in the data store;
  receives information from certain monitors of the plurality of electronic monitors associated with the first worker via a wireless communication link;
  interprets information from a first electronic monitor of the plurality of electronic monitors associated with the first worker based upon information from a second electronic monitor of the plurality of electronic monitors associated with the first worker, wherein plurality of electronic monitors associated with the first worker comprise at least one of a bio-harness, a self-location device, a gyroscope, or an accelerometer;
  interprets information from the plurality of electronic monitors associated with the first worker based upon information from one or more electronic monitors associated with a second worker; and
  based on the interpretations of the information from the plurality of electronic monitors, determining a safety status of the first worker.

20. A worker monitoring system, comprising:
a first plurality of electronic monitors associated with a first worker;
a second plurality of electronic monitors associated with a second worker; and
a monitoring station, wherein the monitoring station comprises a processor, a data store, a non-transitory memory, and an application stored in the non-transitory memory that, when executed by the processor:
  receives definitions of associations of the first plurality of electronic monitors to the first worker;
  stores the definitions of associations of the first plurality of electronic monitors to the first worker in the data store;
  receives information from certain monitors of the first plurality of electronic monitors via a wireless communication link;
  interprets information from a first electronic monitor of the first plurality of electronic monitors based upon information from a second electronic monitor of the first plurality of electronic monitors, wherein the first plurality of electronic monitors comprise at least one of a bio-harness, a self-location device, a gyroscope, or an accelerometer;
  interprets information from the first plurality of electronic monitors based upon information from the second plurality of electronic monitors associated with the second worker; and
  based on the interpretations of the information from the plurality of electronic monitors, determinines a safety status of the first worker.

* * * * *